Jan. 5, 1954   J. N. BROPHY   2,664,591
FISH SCALING MACHINE
Filed Aug. 30, 1951   2 Sheets-Sheet 1
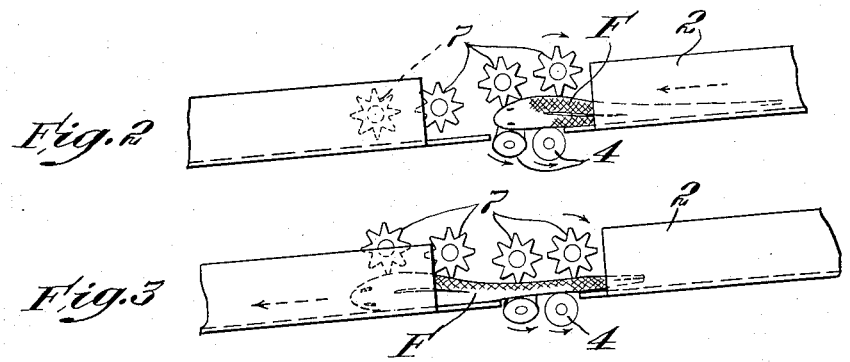
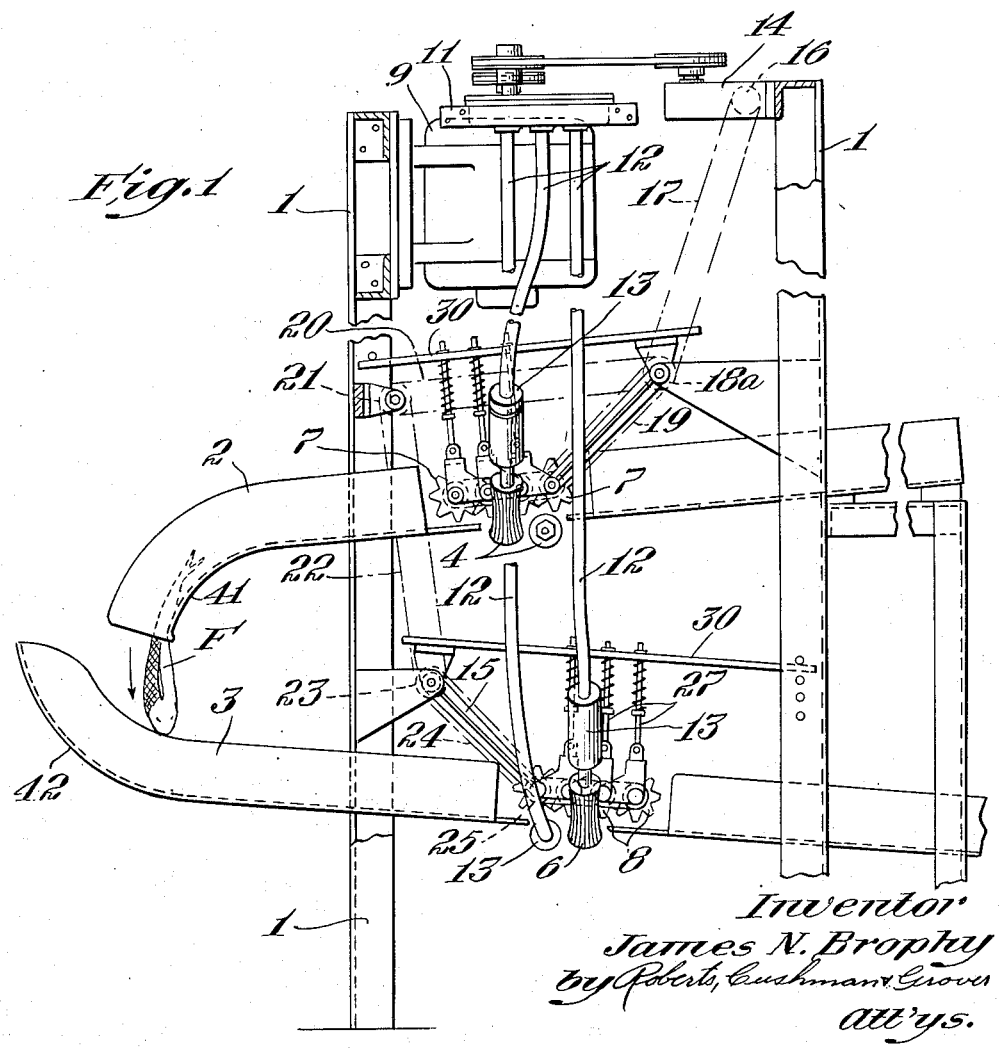
Inventor
James N. Brophy
by Roberts, Cushman & Grover
att'ys.

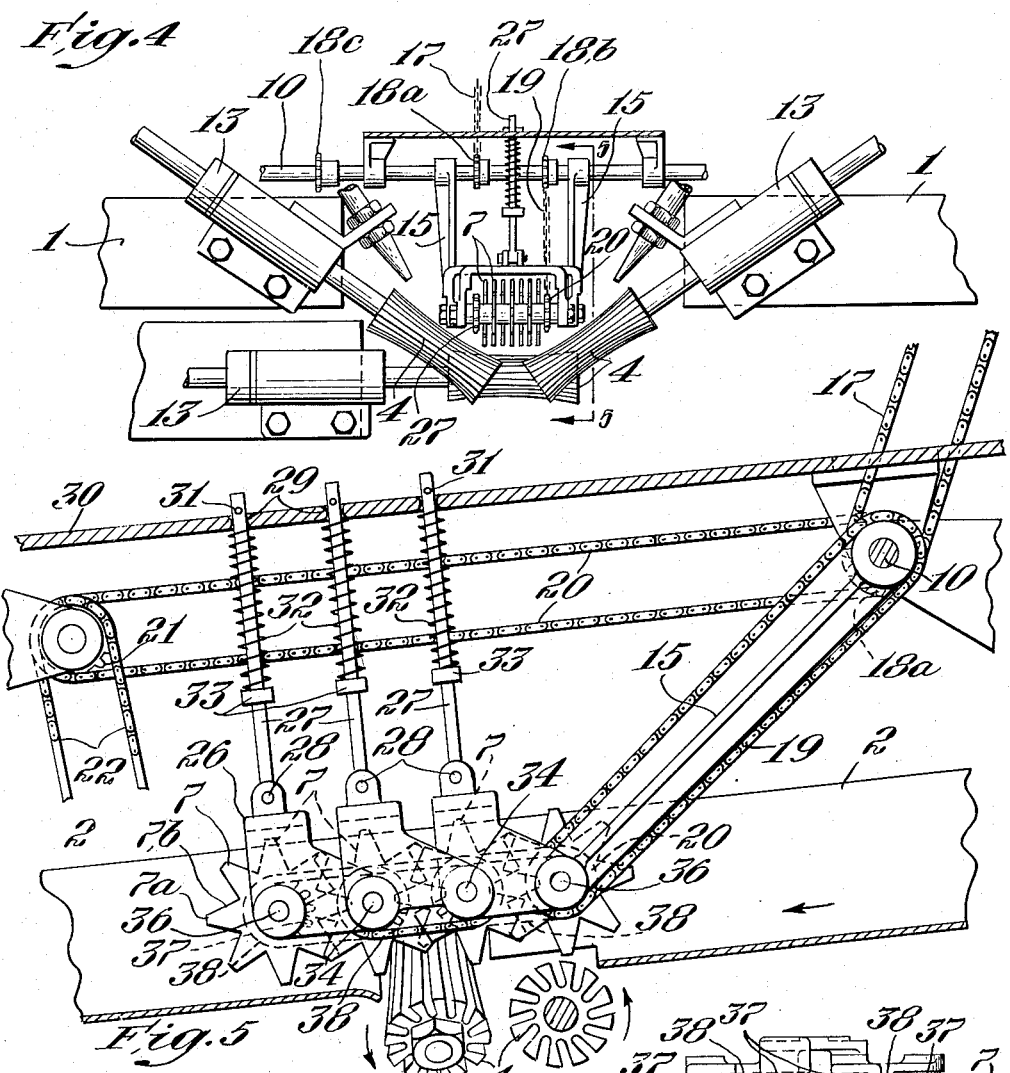
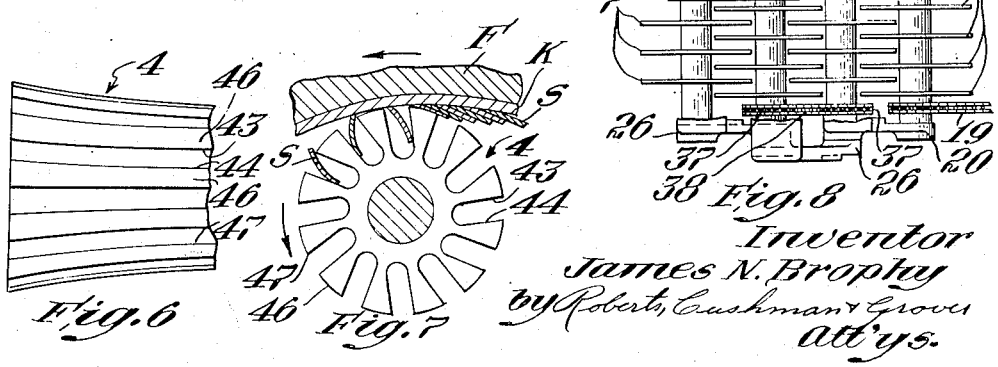

Patented Jan. 5, 1954

2,664,591

UNITED STATES PATENT OFFICE 2,664,591

FISH SCALING MACHINE

James N. Brophy, Wakefield, Mass., assignor, by mesne assignments, to Ruth C. Brophy, Wakefield, Mass.

Application August 30, 1951, Serial No. 244,291

4 Claims. (Cl. 17—5)

This invention relates to improvements in machines for removing scales from fish and particularly to a novel scaling device and means for feeding the fish past said device.

It has been proposed to scale a fish by gripping or impaling and then feeding it past one or more rotating scaling rolls or brushes which remove the scales by abrasion. Such a method causes mutilation of the fish, involves a complicated mechanical structure to avoid interference between the gripping or impaling device and the scaling rolls, and is not readily adapted to fish of different sizes. Another difficulty hitherto encountered arises in maintaining a nearly flat contact between the fish and scaling roll throughout the entire width and successive portions of varying thicknesses. While it has been proposed to employ two superposed rolls, one at the upper side and one at the underside of the fish, the weight of the fish results in one of its sides being too lightly or too heavily scrubbed. Such an arrangement does not satisfactorily scale the thin tail section of small fish.

Objects of the present invention therefore are to provide a fish scaling machine which insures that fish of any of the usual sizes will be fed at the proper rate of speed past a scaling roll without abrasion or mutilation, and will be held against the scaling roll with an even pressure which affords a uniform scaling through the length of the fish.

Another object is to provide a roll for use in the improved machine which will thoroughly scale a fish without tearing the skin or mutilating the flesh.

In one aspect the invention involves a fish scaling machine in which fish are fed successively along a predetermined path and which comprises a scaling roll mounted on one side of the path, preferably below the path, for removing the scales from one side of a fish and rotating in the direction in which the fish travels along said path, a plurality of rotary feeders opposed to the aforesaid scaling roll and disposed on the other side of the path for engaging the other side of the fish to control movement of the fish in said direction, drive means for rotating the scaling roll at one speed and other drive means for driving the feeders at a slower speed, each of the feeders being mounted to move relatively to the other feeders towards and away from the path of the fish, and resilient means yieldingly urging each feeder toward one path so that as the fish are fed by the scaling roll said portions of each fish are held against the roll notwithstanding variation of the thickness of the fish throughout their length. Preferably the distance between successive feeders associated with the scaling roll is less than the length of the fish so that a plurality of feeders engage each fish concomitantly while it passes the roll.

In another aspect a kinematic interconnection is provided between successive feeders to cause them to rotate in unison in their various positions in relation to each other as they move toward and away from the scaling roll. Preferably each pair of adjacent feeders is carried by a support and said kinematic interconnection comprises a rotative linkage or interconnection between each pair of feeders of each support, so that as one feeder of a support is moved relatively to the other the driving connection between the two feeders is maintained. The aforementioned resilient means may act on each of said supports.

In a further aspect the machine comprises a first set of feeders and roll and below the first set a like set of feeders and roll, an upper inclined trough for conveying fish away from the first set and a lower inclined trough leading to the second set in the opposite direction from the upper trough, the upper trough having a downwardly curved exit portion, and the lower trough having an upwardly curved entrance portion toward which said exit portion is directed, so that the fish is fed from the first set of feeders and roll to the second set of feeders and roll and is turned over in passing from the upper to the lower trough, whereby the fish may be scaled on one side by the first and on the other side by the second roll.

In a more specific aspect the scaling roll comprises a body having the elongate circular section form of a solid of revolution, the body having longitudinal grooves in its periphery with longitudinal peripheral surfaces between the grooves, the trailing wall of each groove being inclined to the radius of said body to form an acute angle at the edge adjoining a peripheral surface, and said peripheral surfaces being curved concentrically with the body and being substantially wider circumferentially than the groove, so that said surfaces strike the skin of a fish tangentially without digging into the skin while said edge lifts the scales from a fish and causes them to engage in the groove and be stripped from the skin whereby the fish may be scaled without mutilation or abrasion.

For the purposes of illustration a typical embodiment of the invention is shown in the drawings in which:

Fig. 1 is a side elevation of the fish scaling machine, parts being broken away;

Figs. 2 and 3 are diagrammatic views showing the operation of the machine;

Fig. 4 is an enlarged end elevation, parts being broken away;

Fig. 5 is an enlarged section of a portion of the machine taken on the line 5—5 of Fig. 4;

Fig. 6 is a side elevation of a scaling roll, parts being broken away;

Fig. 7 is a diagrammatic end view of the scaling roll of Fig. 6; and

Fig. 8 is a plan view of a portion of the machine.

The embodiment of the scaling machine shown for the purpose of illustration comprises a frame 1 supporting upper and lower feed troughs 2 and 3, an upper and lower group of scaling rolls 4 and 6, and associated with each group of scaling rolls assemblies of feed wheels 7 and 8 respectively. A motor 9 provides the power for driving the scaling rolls and feed wheels. The scaling rolls are driven through a gear box 11 and flexible couplings 12. The lower end of the flexible couplings 12 are connected to journal boxes 13 which support the scaling rolls. The gearing of the box 11 is designed to drive the scaling rolls at a relatively high velocity, for example 2,000 R. P. M.

The motor 9 also drives a gear reduction box 14 which in turn drives both feed wheel assemblies 7 and 8 through sprocket wheels and chains 16 to 25 inclusive. The feed wheels, which will be described more fully hereinafter, are driven at a speed of approximately one linear foot per second at their periphery.

Each scaling roll is curved inwardly lengthwise, and the rolls are disposed in groups of three with one scaling roll located centrally of the path of the fish along the trough 2 or 3 and with the other two rolls at either side of the path inclined relatively thereto so as to conform with the curved side of the fish. The scaling rolls are driven so that the side of the roll nearest the fish travels in the direction of the fish. As appears in Figs. 2 and 3, the fish travels head first. The feed wheels 7 or 8 rotate oppositely to the scaling rolls so that the portion of the feed wheel nearest the fish travels in the same direction as the fish. Since the scaling rolls are driven at a much greater velocity than the feed wheels the scaling rolls have a tendency to drive the fish, while the feed wheels engage the opposite side of the fish and control its linear speed past the scaling rolls. Mounted adjacent the two side journal boxes 13 are a pair of water nozzles connected to a suitable water supply for flushing removed scales from the fish and the scaling rolls (Fig. 4).

According to the present invention each feeder, as a transverse group of three or four feed wheels may be termed, is movable relatively to other feeders toward or away from the path of the fish along a trough over scaling rolls. As shown in Figs. 4, 5 and 6 each pair of adjacent feeders is carried on a yoke-shaped support 26. The yokes in turn are suspended on plungers 27 by a pivotal attachment at 28. The plungers 27 engage pivotally and slidingly in openings 29 in a plate 30 mounted on the main frame 1 and may reciprocate through the openings. A pin 31 fixed at the upper end of each plunger 27 limits the lower extent to which the plungers may drop the supports 26. Coil springs 32 compressed between the plate 30 and shoulders 33 on the plungers urge the plungers and supports toward their lower position. The openings 29 in the plate 30 are rounded to allow the plunger to swing lengthwise of the path of the fish, and each of the end supports is pivotally attached to the center support at the journals 34 of the center support so that in effect each support is floating and is capable of not only moving up and down but swinging around one of the journals 34.

Thus, whether the feeders 7 are overlapping as shown in Fig. 5 or slightly spaced as shown in Figs. 2 and 3, they are free to move upwardly against the compression of the spring 32 as the fish passes between the feed wheel and the scaling rolls. The obtuse angles 7a formed by the peak 7b of the feed wheels 7 (Fig. 5) are sufficiently sharp to engage the upper side of the fish without damaging the fish. Thus, a fish will progress along its path past the scaling rolls 4 at a rate determined by the velocity of the feed wheels or feeders, and at the same time will be yieldingly urged by the springs 32 against the scaling rolls, the feeders rising and dropping accordingly as a thick or thin portion of the fish passes under them. If one feeder rises or drops more than an adjacent feeder its yoke support 26 will pivot relatively to the adjacent support about the journals 34, and the plungers 27 will pivot relatively to the supports about the pivot point 28, so that each feeder may move relatively to the other feeders toward and away from the path of the fish.

At the journals 34 of the center support or journals 36 of the end supports each of the four feeds or groups of feed wheels is connected with a sprocket wheel 37. The four sprocket wheels are rotatively interconnected by three sprocket chains 38. Because the sprocket wheels are mounted at the pivot point 34 of the supports 26, relative movement of the supports to each other does not disrupt the rotative connection between the four sprocket wheels, therefore as the feeders rise and drop they will continue to be driven at substantially the same velocity and thus avoid tearing of the fish. The right-hand sprocket wheel 38 in Fig. 5 is driven by the sprocket chain 19 carried on a pivoted arm 15 which is free to swing when the right-hand sprocket wheel rises or drops. At the lower trough 3 the lower set of feeders 8 are kinematically interconnected in the same manner as the upper feeders.

As shown in Fig. 1, the upper trough 2 is downwardly inclined away from the upper scaling rolls 4 and has at its lower end a downwardly curved portion 41 when the fish F, which has been scaled on its left side, exits from the upper trough 2. The lower trough 3 which is downwardly inclined toward the second set of scaling rolls 6 has at its upper end an upwardly curved entrance portion 42 toward which the exit portion 41 of the upper trough is directed. After leaving the upper scaling rolls the fish will progress along the trough 2 by gravity to the exit 41 and in passing to the entrance 42 of the lower trough 3 will be turned over so that its unscaled right side is faced downwardly. The fish will then proceed by gravity along the trough 3 to the second set of scaling rolls 6 which then remove the scales from the right-hand side of the fish and deliver it at the lower end of the trough 3.

As shown in detail in Figs. 6 and 7, the scaling roll comprises a cylindrical body 4 having leading walls 43 and trailing walls 44 forming grooves lengthwise of the body and longitudinal surfaces 46 between the grooves. The trailing wall 44 of each groove is inclined to the radius of the body and forms with the adjacent surface 46 an edge 47 having an acute angle. As shown diagrammatically in Fig. 7, the longitudinal surfaces 46, which are curved concentrically with the body 4, approach the skin K of the fish F substantially tangentially and support the fish in such a way that the acute edge 47 does not tend to abrade or otherwise puncture the skin. The acute edge 47 which is travelling at a much greater speed than the fish F approaches the scales S and tends to slide or slice between the scales lifting them away from the skin and causing them to be engaged in the grooves formed by the walls 43 and 44. As the grooves rotate past the lifted scales, because of the high velocity of the scaling roll 4, the lifted scales are engaged and stripped from the skin. The result is that the fish is very thoroughly scaled without mutilation of the skin or flesh, although the weight of the fish, of the feed roll assembly and the force of the spring 32 is supported by the curved peripheral surfaces 46.

It should be understood that the present disclosure is for the purpose of illustration only and that this invention includes all modifications and equivalents which fall within the scope of the appended claims.

I claim:

1. A fish scaling machine comprising means forming a path along which fish travel successively, a scaling roll on one side of the path for stripping scales from one side of the fish, the periphery of said roll adjacent the fish moving lengthwise of the direction of travel to strip scales lengthwise of the fish, a rotary feeder on the other side of said path for engaging the other side of the fish to control movement of the fish along said path, drive mechanism for said roll and feeder, connections between said drive mechanism and said roll and feeder respectively including speed control means driving the feeder at a slower speed than said roll, said feeder comprising a plurality of feed wheels spaced lengthwise of the path straddling the scaling roll, and resilient supporting means for each of the feed wheels yieldingly urging each wheel independently toward said scaling roll, whereby successive portions of the fish are held against the roll notwithstanding variations in the thickness throughout the length of the fish.

2. A fish scaling machine comprising means forming a path along which fish travel successively, a scaling roll on one side of the path for stripping scales from one side of the fish, the periphery of said roll adjacent the fish moving lengthwise of the direction of travel to strip scales lengthwise of the fish, a rotary feeder on the other side of said path for engaging the other side of the fish to control movement of the fish along said path, drive mechanism for said roll and feeder, connections between said drive mechanism and said roll and feeder respectively including speed control means driving the feeder at a slower speed than said roll, said feeder comprising a plurality of feed wheels spaced lengthwise of the path and straddling the scaling roll, the distance between successive feeders being less than the length of a fish so that a plurality of feeders engage each fish concomitantly while it passes said roll, and resilient supporting means for each of the feed wheels yieldingly urging each wheel independently toward said scaling roll, whereby successive portions of the fish are held against the roll notwithstanding variations in the thickness throughout the length of the fish.

3. A fish scaling machine comprising means forming a path along which fish travel successively, a scaling roll on one side of the path for stripping scales from one side of the fish, the periphery of said roll adjacent the fish moving lengthwise of the direction of travel to strip scales lengthwise of the fish, a rotary feeder on the other side of said path for engaging the other side of the fish to control movement of the fish along said path, drive mechanism for said roll and feeder, connections between said drive mechanism and said roll and feeder respectively, including speed control means driving the feeder at a slower speed than said roll, said feeder comprising a plurality of feed wheels spaced lengthwise of the path straddling the scaling roll, a support for each feed wheel, resilient means yieldingly urging each wheel support independently toward said scaling roll, whereby successive portions of the fish are held against the roll notwithstanding variations in the thickness throughout the length of the fish, a pivotal connection between adjacent wheel supports to allow each support to move independently of adjacent supports into various relative positions with respect to said path forming means, and said drive mechanism including separate kinematic interconnections between adjacent wheels to allow the wheels to rotate in unison while in their various positions relative to each other.

4. A fish scaling machine comprising a frame, means on the frame forming a path along which fish travel successively, a scaling roll on one side of the path for stripping scales from one side of the fish, the periphery of said roll adjacent the fish moving lengthwise of the direction of travel to strip scales lengthwise of the fish, an arm pivoted at one end to the frame to allow its free end to swing toward and away from said path forming means, first and second drive wheels at the pivoted and free ends respectively of said arm, a feed wheel carried at the free end of said arm and axially connected to the drive wheel at said free end, a support pivoted to said free end, a second feed wheel on said support, a third drive wheel axially connected to said second feed wheel, a driving connection on said arm between said first and second drive wheels, a driving connection on said support between said second and third drive wheels, drive mechanism for said roll and feed wheels, connections between said drive mechanism and said roll and said first drive wheel respectively including speed control means driving the feed wheels at a slower speed than said roll, whereby said feed wheels may be driven in unison while independently swinging toward and away from said path, and resilient means yieldingly urging the wheel support toward said scaling roll, whereby successive portions of the fish are held against the roll notwithstanding variations in thickness throughout the length of the fish.

JAMES N. BROPHY.

References Cited in the file of this patent

UNITED STATES PATENTS

| Number | Name | Date |
|---|---|---|
| 1,016,442 | Roberts et al. | Feb. 6, 1912 |
| 1,256,276 | Straub | Feb. 12, 1918 |
| 1,507,724 | Barry | Sept. 9, 1924 |
| 1,569,360 | Edwards | Jan. 12, 1926 |
| 1,744,875 | Edwards | Jan. 28, 1930 |
| 2,128,607 | Godfrey | Aug. 30, 1938 |